Sept. 15, 1931.  J. S. KERN ET AL  1,823,201
TOP EXTENSION
Filed April 25, 1929   2 Sheets-Sheet 1
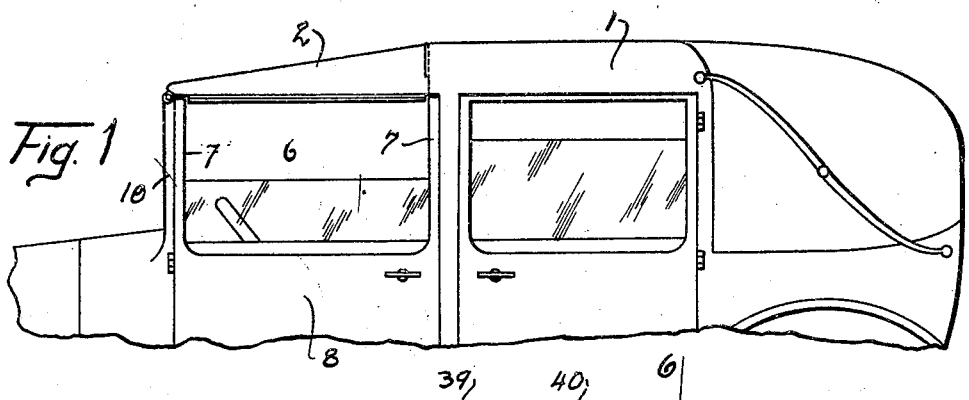
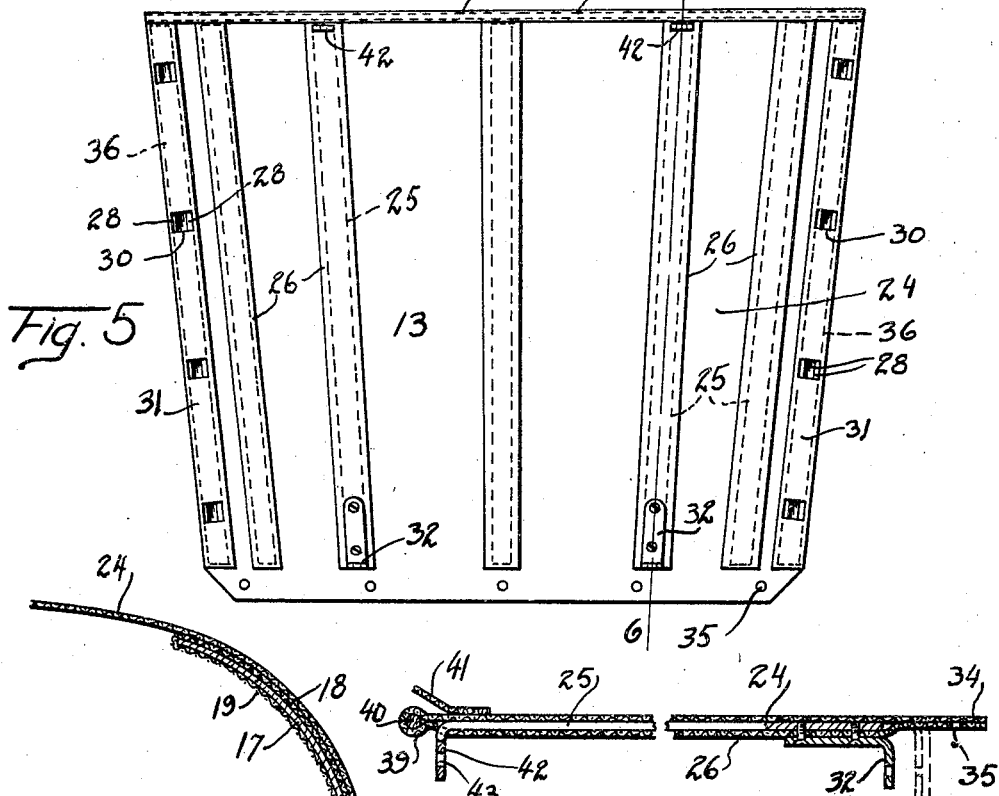
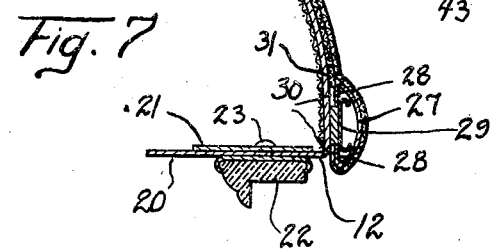
INVENTORS
Jacob S. Kern
Osceola L. Currier
BY
ATTORNEY.

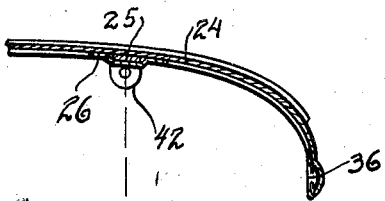
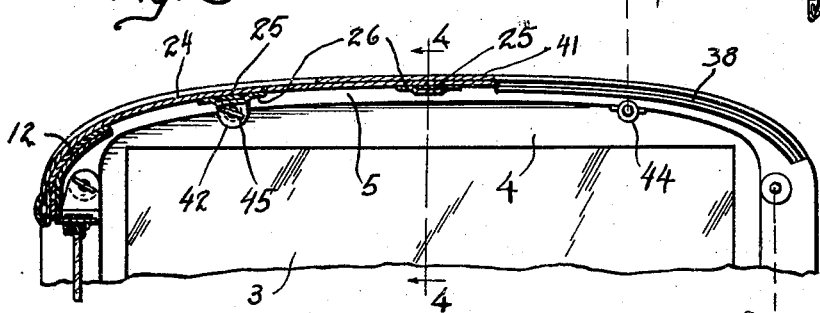
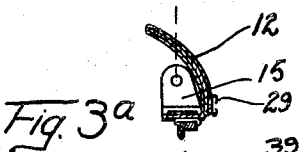
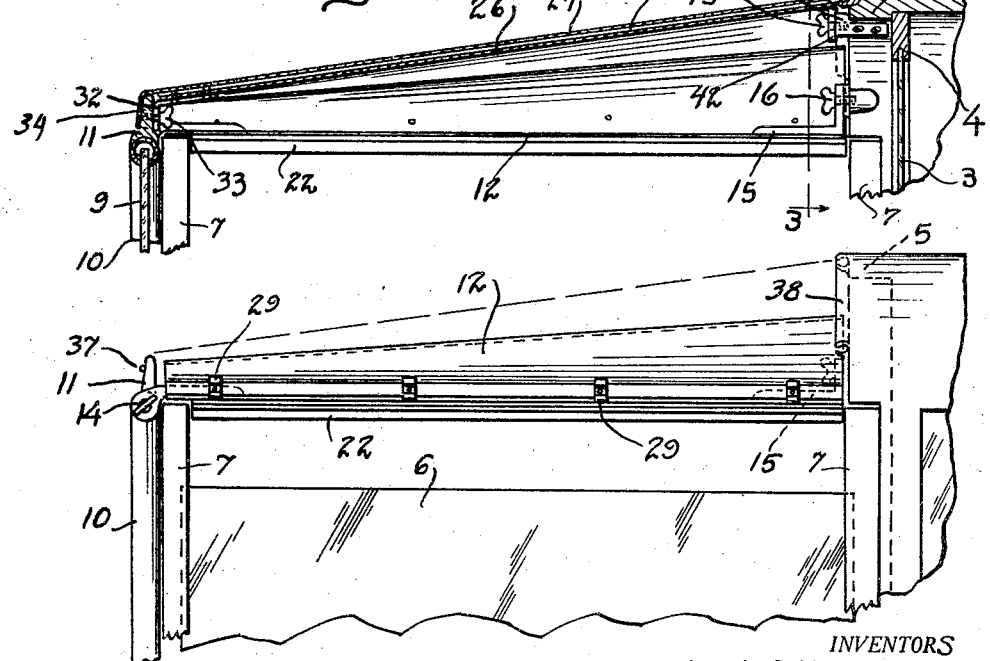
INVENTORS
Jacob S. Kern
Osceola L. Currier
BY
ATTORNEY.

Patented Sept. 15, 1931

1,823,201

UNITED STATES PATENT OFFICE

JACOB S. KERN, OF FLEETWOOD, AND OSCEOLA L. CURRIER, OF MOUNT PENN, PENNSYLVANIA, ASSIGNORS TO FLEETWOOD BODY CORPORATION, OF FLEETWOOD, PENNSYLVANIA, A CORPORATION OF PENNSYLVANIA

TOP EXTENSION

Application filed April 25, 1929. Serial No. 357,908.

This invention relates to a top extension for a brougham or town car.

This invention relates more particularly to a removable front roof portion for a brougham or town car which is simple in construction and neat in appearance. This removable front roof portion consists of removable side roof rails, a removable deck arranged to be snapped on to the side roof rails and the forward end of which is arranged to be removably held to the cross bar of the windshield by means of hand screws and the rear end of which is arranged to have a sliding fit in a channeled forward cross bow.

In the drawings:

Fig. 1 is a fragmentary perspective of a brougham or town car showing the removable front roof portion.

Fig. 2 is side elevation showing the removable side roof rails in position, the removable deck portion being removed.

Fig. 3 is a section along the line 3—3 of Fig. 4.

Fig. 3a is a detail cross section of a roof side rail.

Fig. 3b is a detail cross section of a portion of the removable deck.

Fig. 4 is a longitudinal section of the removable roof portion along line 4—4 of Fig. 3.

Fig. 5 is a bottom plan view of the removable deck.

Fig. 6 is a section along the line 6—6 of Fig. 5.

Fig. 7 is a detail cross section showing the snap fastening between the deck and the side roof rail.

Referring more particularly to the drawings, Fig. 1 shows a brougham or town car having a permanent rear roof portion generally designated 1, and a removable front roof portion over the driver's seat which is generally designated 2. The rear portion of the body is separated from the front portion by a partition which consists of the window 3 and the window frame 4. The forward end of the permanent rear roof portion 1 is supported by the forward cross bow 5.

The driver's compartment is enclosed by means of the windows 6 which are guided along the sides by the guides 7 which form a part of the door 8 and by the windshield 9 which is pivotally mounted between the windshield pillars 10.

The removable front roof portion consists of the removable side roof rails 12 and the removable deck 13. The removable side rails 12 are secured at their forward ends to the windshield pillars 10 by means of the screws 14 and at their rear ends to the forward cross bow by means of the L-brackets 15 and the winged screws 16.

It is desirable in a removable front roof portion of this type to give it an appearance of permanency and to have its lines harmonize with those of the permanent rear roof portion. Hence, to this end the roof rails are made of any suitable material such as sheet metal, and consist of the elongated arcuate portion 17 and the inwardly turned flange portion 20. The arcuate portion 17 is covered on the outside by felt 18 and on the inside by fabric 19. Since the roof fabric hugs the arcuate portion 17, the arcuate portions of the roof rails define the quarter of the roof and prevent sagging of the deck fabric. Extending lengthwise of the flange portion 20 is the metal strip 21. The rubber window sash stops 22 are fixed to the flanged portions of the side roof rails by any suitable means such as the lugs 23 which extend through, and are riveted over, the strip 21.

The removable deck consists of the fabric canopy 24 which is suitably stiffened by stays 25. These stays are secured to the fabric 24 by the lengthwise strips of fabric 26 which cover the stays and are sewed to the fabric canopy along the sides of the stays. Each side of the removable deck is folded back upon itself as at 31 and has secured therebetween the metal strips 36 each of which consists of the elongated arcuate portion 27 and the turned in lips 28. The strips 36 are constructed of suitable spring metal and serve not only as stiffening stays for the deck but also as the female snap members which snap over the male snap members 29 which are spot welded to the side roof rails 12, the deck fabric being cut away on the under side opposite the male snap members 29 as at 30.

The windshield pillars 10 support the windshield cross bar 11. The forward end of the deck is secured to the windshield cross bar 11 by means of the L-brackets 32 and the hand screws 33, the brackets 32 being riveted or otherwise suitably fixed to the stiffening stays of the deck. By referring to Fig. 6 it will be noted that a portion of the deck fabric extends beyond the forward end of the stays as at 34. This portion of the deck fabric has suitable snap members 35 therein and is arranged to over-lap the cross bar 11. The cross bar 11 carries the male snap members 37 which engage the female snaps 35 to effect a weather proof connection.

The forward cross bow 5 has a channel portion 38. The rear end of the deck fabric is folded back upon itself to form the tube 39 which encloses a flexible rod 40. There is also secured crosswise of the rear end of the deck the flap member 41. The tubular rear end of the deck is arranged to be slid into the channel 38 with the flap 41 overlapping the channel. The rear end of the stays 25 are flanged as 42, (Fig. 6). These flanges have the apertures 43. Fixed to the forward bow are a series of brackets 44 which have threaded openings therein. After the tubular rear end of the deck has been slid through the channel portion 38, the rear portion of the deck is secured to the forward bow by means of the hand screws 45 which pass through the flanges 42 and screw into the brackets 44. This tubular channel connection in conjunction with the overlying flap 41, provides a weatherproof connection between the removable front roof portion and the permanent rear roof portion.

In assembly the side roof rails are first secured at their forward ends to the windshield pillar posts and at their rear ends to the forward cross bow as above described. Then the tubular rear portion of the deck is slid into the forward cross bow channel, the forward end of the deck secured to the cross bar, and the deck then drawn taut and snapped onto the side roof rails.

From the above description it is evident that we have produced a front roof portion that is simple in construction and assembly, and which is also weatherproof and neat in appearance.

What we claim is:

In an automobile body of the brougham type or the like, a top extension comprising a pair of side roof rails, a deck of fabric or the like covering each rail and extending therebetween, an elongated spring metal clip carried longitudinally within each side of the deck adjacent the side roof rails, the decking having a plurality of openings therethrough along each spring clip, and means carried by the side roof rails arranged to project through the openings in the deck whereby the elongated metal clips may be sprung onto the said means to removably secure the deck to the side roof rails.

In testimony whereof we affix our signatures.

JACOB S. KERN.
OSCEOLA L. CURRIER.